(12) United States Patent
Schanz

(10) Patent No.: US 10,562,195 B2
(45) Date of Patent: Feb. 18, 2020

(54) GRIPPER, IN PARTICULAR PNEUMATICALLY OPERATED GRIPPER IN THE FORM OF A VACUUM GRIPPER OR GRIPPING TONGS

(71) Applicant: FIPA Holding GmbH, Ismaning (DE)

(72) Inventor: Henning Schanz, Gilching (DE)

(73) Assignee: FIPA Holding GmbH, Ismaning (DE)

( * ) Notice: Subject to any disclaimer, the term of this patent is extended or adjusted under 35 U.S.C. 154(b) by 0 days.

(21) Appl. No.: 16/184,438

(22) Filed: Nov. 8, 2018

(65) Prior Publication Data

US 2019/0143537 A1    May 16, 2019

(30) Foreign Application Priority Data

Nov. 15, 2017 (EP) .................................. 17201880

(51) Int. Cl.
*B25J 15/06* (2006.01)
*B25J 15/00* (2006.01)
*B25J 19/00* (2006.01)

(52) U.S. Cl.
CPC ........... *B25J 15/0683* (2013.01); *B25J 15/00* (2013.01); *B25J 15/0023* (2013.01); *B25J 15/0616* (2013.01); *B25J 19/0075* (2013.01)

(58) Field of Classification Search
CPC ... B25J 15/0641; B25J 13/086; B25J 15/0683
(Continued)

(56) References Cited

U.S. PATENT DOCUMENTS 3,207,348 A * 9/1965 Olson ..................... B66F 9/181
                                                    294/183
3,734,325 A * 5/1973 Stone .................... B66C 1/0212
                                                    414/626
(Continued)

FOREIGN PATENT DOCUMENTS

DE    10 2012 215797 A1    3/2013
DE    20 2015 103985 U1    8/2015
(Continued)

OTHER PUBLICATIONS

European Search Report from European Patent Application No. 17201880.6 dated Feb. 16, 2018.

*Primary Examiner* — Paul T Chin
(74) *Attorney, Agent, or Firm* — Greenberg Traurig, LLP

(57) ABSTRACT

The present invention relates to a gripper (100) and in particular a pneumatically operated gripper (100) in the form of a vacuum gripper or gripping tongs. The gripper (100) comprises a gripper holder (3.1, 3.2) via which the gripper (100) is preferably detachably connectable to a manipulator, robotic arm or the like. The gripper (100) further comprises at least one gripping member (2.1, 2.2) connected to the gripper holder (3.1, 3.2) and realized such that an object to be gripped or workpiece can be gripped by manipulating the at least one gripping member (2.1, 2.2). In order to achieve the gripper (100) being able to gently grip an object to be gripped, whereby both the object to be gripped as well as the at least one gripping member of the gripper are effectively protected against damage while the object to be gripped is being manipulated, the invention provides for the at least one gripping member (2.1, 2.2) to have a flocking (5) at least in the area which comes into contact with the object to be gripped/workpiece during the manipulating of the at least one gripping member (2.1, 2.2).

19 Claims, 2 Drawing Sheets

Figure 1A:
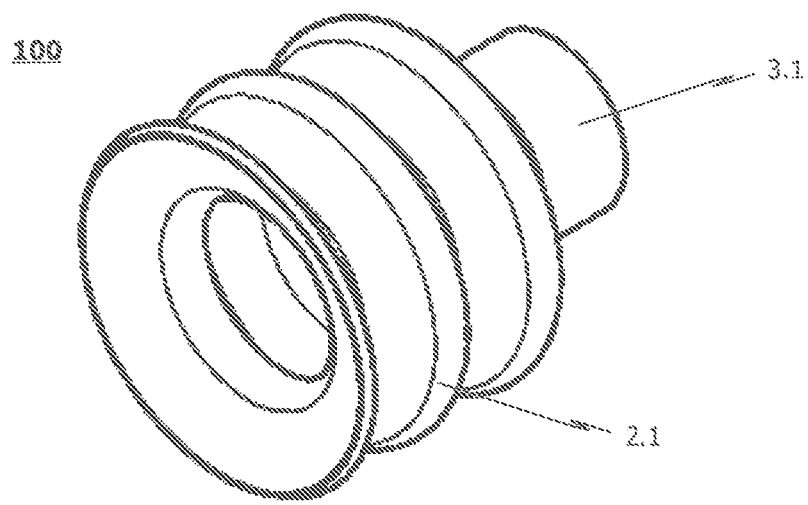

(58) Field of Classification Search
USPC .................................................. 294/183, 185
See application file for complete search history.

(56) References Cited

U.S. PATENT DOCUMENTS

| | | | | |
|---|---|---|---|---|
| 5,275,452 | A * | 1/1994 | Cleveland | B66D 1/00 24/598.5 |
| 5,984,623 | A * | 11/1999 | Smith | B65G 61/00 294/104 |
| 6,561,744 | B2 * | 5/2003 | Liang | H01L 21/6838 294/183 |
| 6,860,531 | B2 * | 3/2005 | Sherwin | B25J 15/0052 294/103.1 |
| 2010/0032972 | A1 * | 2/2010 | Braunschweiger | B65G 61/00 294/185 |
| 2014/0227473 | A1 | 8/2014 | Parness et al. | |
| 2014/0264394 | A1 * | 9/2014 | Wityak | H01L 33/46 257/88 |
| 2018/0215540 | A1 * | 8/2018 | Tanaka | B65G 61/00 |
| 2018/0314265 | A1 * | 11/2018 | Matsuno | G05D 1/0248 |

FOREIGN PATENT DOCUMENTS

| | | |
|---|---|---|
| WO | 03/099951 A2 | 12/2003 |
| WO | 2017/121450 A2 | 10/2007 |

\* cited by examiner

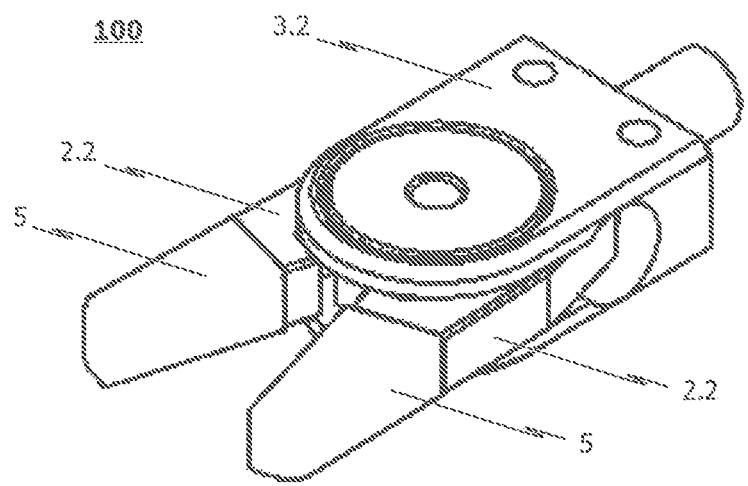
*FIG. 2a*
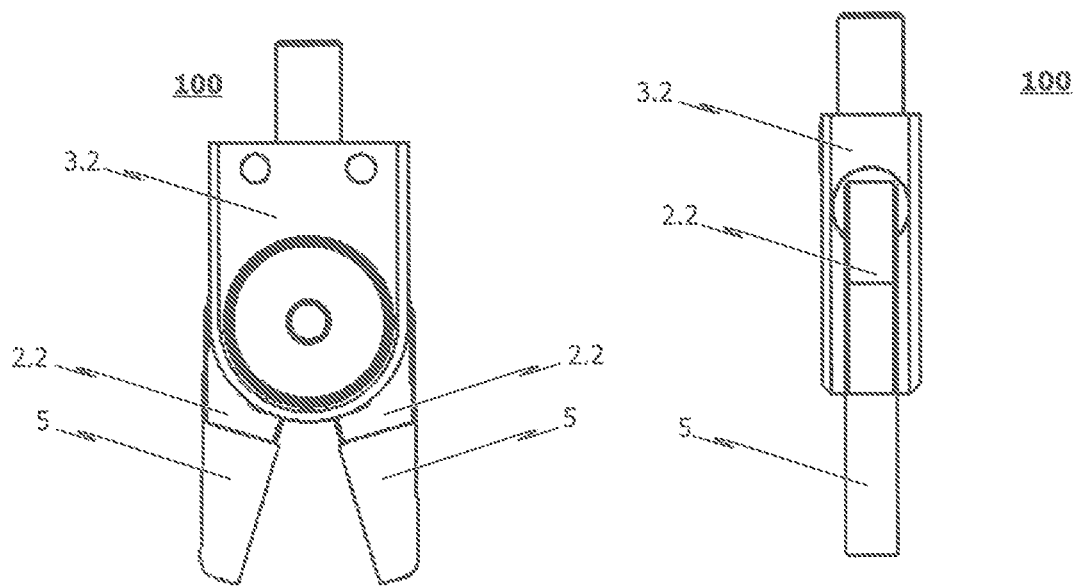
*FIG. 2b*  *FIG. 2c*

GRIPPER, IN PARTICULAR PNEUMATICALLY OPERATED GRIPPER IN THE FORM OF A VACUUM GRIPPER OR GRIPPING TONGS

RELATED APPLICATIONS

The present application claims priority from European Patent Application No. 17 201 880.6 filed Nov. 15, 2017, which is incorporated herein by reference in its entirety for all purposes.

DESCRIPTION

The present invention relates to a gripper, in particular a pneumatically operated gripper in the form of a vacuum gripper or gripping tongs.

The principle of such a gripper is known from the prior art. Cited as an example of this is DE 19 855 630 B4 which relates to a pneumatically operated gripper in the form of gripping tongs. Cited as a further example is DE 20 2005 0071 45 U1, which relates to a vacuum gripper for suctioning and holding workpieces.

Regardless of their design, grippers are frequently used in conjunction with industrial robots to manipulate various objects. Grippers which are implemented as vacuum grippers are frequently needed to suction and hoist objects and to be able to transport them to a different location. To that end, a vacuum gripper usually comprises a flexible suction cup, which limits a suction area connectable to a vacuum source, and a suction opening in the surrounding frontal border area as well as an opposite rear end region. The suction opening of the suction cup is usually formed with a sealing lip which abuts or is able to butt against the surface of the object to be manipulated (object to be gripped/workpiece) and then encloses a suction area between the suction cup and the surface of the object which is able to be accordingly evacuated. As a result, the suction cup lays tight against the surface of the object and holds it pneumatically.

Such vacuum grippers have proven to be of value particularly in the handling of sheet metals, e.g. in the automobile industry.

Grippers in form of gripping tongs usually have two rigid pincer-like gripper jaws which are pivotable or linearly displaceable relative to one another along suitable guides and grasp and grip an object to be gripped from opposite sides by way of facing gripping surfaces.

However, the use of known gripping systems—whether in the form of vacuum grippers or in the form of gripping tongs—for manipulating in particular fragile and/or easily deformable objects is currently only possible to a limited extent. This is particularly due to the fact that a controlled handling of objects by vacuum grippers or gripping tongs requires that the objects to be handled are accordingly resistant to breakage and deformation.

Furthermore, it is unavoidable when using gripping systems to manipulate objects for the at least one gripping member of the gripper (suction cup with a gripper implemented as a vacuum gripper and/or gripping tongs having gripper jaws) to make contact which, under certain circumstances, results in damage to particularly the surface of the object to be gripped.

The task of the present invention is that of specifying a gripper of the type cited at the outset which is able to gently grip an object to be gripped, wherein both the object to be gripped as well as the at least one gripping member of the gripper are effectively protected against damage while the object to be gripped is being manipulated.

In particular, a gripper is to be specified with which an object to be gripped can be handled without leaving any marks or traces.

The invention solves this task with the subject matter of independent claim 1, whereby advantageous further developments of the inventive gripper are specified in the corresponding dependent claims.

Accordingly, the present invention relates in particular to a gripper which comprises a gripper holder as well as at least one gripping member. The gripper is preferably detachably connectable to a manipulator, robotic arm or the like via the gripper holder. The at least one gripping member of the gripper is connected to the gripper holder and is realized in such a way that an object to be gripped/workpiece can be gripped by manipulating the at least one gripping member.

In order to be able to grip the object to be gripped as gently as possible and effectively prevent damage to the surface of the object to be gripped and/or the surface of the at least one gripping member, the invention in particular provides for the at least one gripping member to have a flock coating at least in the area which comes into contact with the object to be gripped/workpiece during the manipulating of the at least one gripping member.

Noted as a further essential characteristic of the flocking is that it also prevents marks/traces of the gripper from being left on the object to be gripped. Such marks/traces are on the one hand often unacceptable for aesthetic reasons and in the worst case, even prevent further flawless surface treatment of e.g. the gripped object's finishing. A typical surface treatment which requires a non-marked surface particularly also includes surface metallization and/or vaporization.

The flocking preferably exhibits fiber filaments particularly in the form of short-cut fibers. These fiber filaments preferably consist of polyamide, viscose and/or polyester.

According to embodiments of the inventive gripper, the fiber filaments of the flocking in the area which comes into contact with the object to be gripped/workpiece during the manipulation of the at least one gripping member are at least in some areas connected to the at least one gripping member or at least in some areas incorporated into the material of the at least one gripping member such that the fiber filaments preferably extend substantially perpendicular from the surface of the gripping member.

It has thereby been shown that the inventive gripper enables a particularly gentle handling of objects when the area of fiber filaments extending from the surface of the gripping member is of a length of from 0.1 to 1.0 mm, preferably 0.2 to 0.8 mm, and even further preferentially 0.3 to 0.7 mm. The 0.3 to 0.7 mm length range is a compromise between being able to realize a particularly gentle handling of objects on the one hand and the most controlled handling of the objects as possible on the other.

Different solutions with respect to the flocking are possible. However, shown to have been particularly advantageous in the context of conducted experiments is when the flocking exhibits fiber filaments having a weight (Dtex) of 2.0 to 5.0 g per 10,000 m and preferably a weight of 2.5 to 4.0 g per 10,000 m and even more preferentially, 2.8 to 3.8 g per 10,000 m.

According to embodiments of the inventive gripper, same is realized as a vacuum gripper and comprises a flexible suction cup serving as the gripping member as well as a suction cup holder serving as the gripper holder. The flexible suction cup serving as gripping member limits a suction area connectable to a vacuum source and comprises at least one seal having a sealing surface facing at least in part toward the object/workpiece to be gripped. The suction cup holder serving as gripper holder is connected to the rear end region of the suction cup.

This conceivable realization of the inventive gripper in particular provides for at least part of the sealing surface of the at least one seal of the vacuum gripper to be provided with the flocking.

Further developments of this realization of the inventive gripper provide for the suction cup to have a suction opening adjacent the front end region and a seal surrounding the suction opening, wherein said seal is in particular realized in the form of at least one sealing lip having a sealing surface at least partially facing toward an object/workpiece to be gripped and at least part of which is provided with the flock.

Alternatively or additionally thereto, it is conceivable for the gripper realized as a vacuum gripper to comprise at least one hold-down element having a contact surface facing toward an object/workpiece to be gripped which is at least in part provided with the flock.

The providing of such a hold-down element enables the gripper realized as vacuum gripper to also be able to manipulate relatively heavy pliable materials in particularly gentle manner.

In this context, it is advantageous with respect to the hold-down element for the contact surface of the at least one hold-down element to be situated in a plane which intersects the suction area limited by the suction cup, whereby the front end region of the suction cup can move relative to the rear end region of the suction cup and relative to the contact surface of the at least one hold-down element by the suction cup changing length.

Alternatively to the previously discussed embodiment, however, it is also appropriate to realize the inventive gripper as gripping tongs, in which two pincer-like gripper jaws which are pivotable or linearly displaceable relative to one another along suitable guides are used as gripping members. These gripper jaws are designed to grasp and/or grip an object/workpiece to be gripped from opposite sides by way of facing gripping surfaces. This embodiment of the inventive gripper in particular provides for the flocking to be provided on at least part of the gripping surfaces.

A further development of this embodiment provides for the gripper jaws of the gripper realized as gripping tongs to be coated with an elastic material at least in the area of the gripping surfaces, whereby the fiber filaments of the flock at least partially extend from the surface of said elastic material. Different materials are feasible as the elastic material, whereby however a synthetic rubber, particularly a hydrogenated nitrile butadiene rubber (HNBR), has shown to be particularly suitable.

Due to the lack of double bonds, HNBR material has the advantage of being very slow to react. This thus increases the material's durability. In addition, HNBR material is relatively temperature-resistant, whereby the gripper jaws coated with HNBR can be operated for example up to a temperature of 150° Celsius or can respectively be brought into contact with gripped objects at temperatures of up to 150° Celsius.

The following will describe exemplary embodiments of the gripper according to the invention in greater detail on the basis of the accompanying drawings.

Figures 1B, 1C:
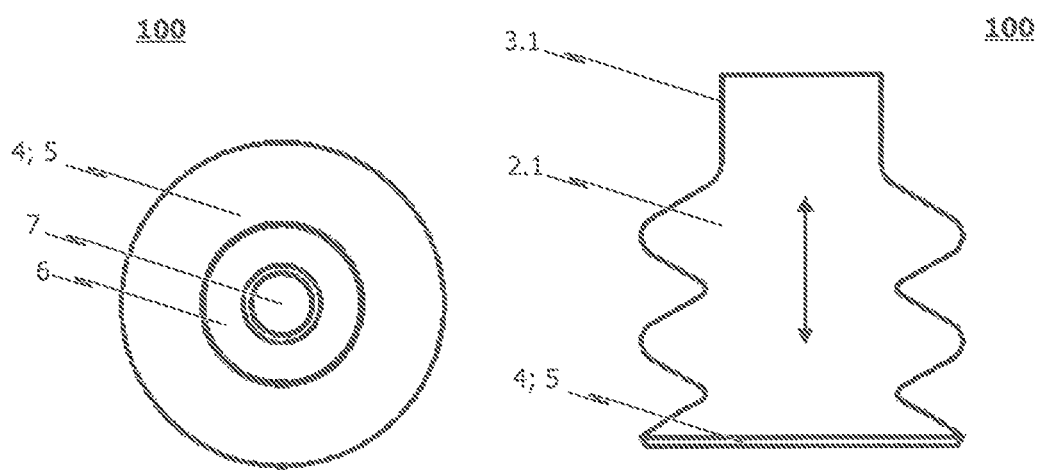

Shown are:

FIG. 1a-c various views of a first exemplary embodiment of the inventive gripper in the form of a vacuum gripper; and FIG. 2a-c various views of a second exemplary embodiment of the inventive gripper in the form of gripping tongs.

FIGS. 1a-c show a side view, an isometric view as well as a top view from below of a first exemplary embodiment of the inventive gripper 100. This exemplary embodiment is configured in the form of a vacuum gripper.

The vacuum gripper has an overall elongated shape with a longitudinal axis. It is or can be furnished with any type of gripper holder on the rear side, by means of which the vacuum gripper can be preferably detachably fixed to a manipulator device not shown in the drawings. The manipulator device enables the vacuum gripper to be moved and positioned, and that namely according to the respective intended purpose. The manipulator device is in particular of mechanical type and may contain one or more electrical and/or fluid drives.

The vacuum gripper comprises a flexible suction cup 2.1, which serves as the gripping member, which is fixed by its rear end region to the gripper holder (suction cup holder 3.1). The suction cup 2.1 preferentially has rubber-elastic properties, whereby it in particular consists of an elastomer material.

The gripper holder (suction cup holder 3.1) consists for example of metal, whereby when manufactured from plastic material, the suction cup 2.1 may be integrally formed by injection molding to the gripper holder (suction cup holder 3.1) by its rear end region.

The suction cup 2.1 is a hollow body and extends coaxially with the longitudinal axis from its rear end region to a front side where it ends in a front end region.

The suction cup 2.1 defines a suction area 6 which opens to the surroundings at the front of the suction cup 2.1 by way of a suction opening.

The suction area 6 can be connected as needed to a (not shown) vacuum source by means of a suction channel 7. Vacuum sources refer for example to a vacuum pump or a suction nozzle operating according to the ejector principle. The vacuum source can be arranged externally or also on the manipulator device or directly on the vacuum gripper.

When appropriately controlled, the suction area 6 can also be subjected to atmospheric pressure or a higher excess pressure via the suction channel 7 should a previously generated negative pressure then need to be dissipated.

Due to the flexibility of the suction cup 2.1, the front end region is in a position to execute a linear lifting motion relative to the back end region as indicated by the double arrow. In doing so, the length of the suction cup 2.1 changes.

As long as the suction cup 2.1 is not yet positioned at an object to be handled, the initial position shown in FIG. 1a-c is given. The suction cup 2.1 is at its maximum length here, as imparted by its structure and choice of materials.

Pursuant to the embodiment depicted in the drawings, the suction cup 2.1 is of bellows-like structure. Its wall thus exhibits—when viewed in longitudinal section—a zigzag profile. The suction cup 2.1 thus has an internal folding of one or more annular internal folds on the inner side facing the suction area 6 and an external folding of one or more annular external folds on its outer periphery. If there are a plurality of internal folds and/or external folds—as in the example embodiment shown in FIG. 1—they are then arranged coaxially to one another.

In the exemplary embodiment of the inventive gripper 100 according to FIG. 1a-c, sections of the suction cup 2.1 are provided with a flocking 5. In the depicted embodiment, it is particularly the front end region of the suction cup 2.1, which comes into contact with an object to be handled, which is provided with the flocking 5.

FIGS. 2a-c show a further exemplary embodiment of the inventive gripper 100, and that in an isometric view, in a side view and also in a top view. In this second exemplary embodiment of the inventive gripper 100, the gripper 100 is configured as gripping tongs.

The gripping tongs comprise gripper jaws 2.2 as the gripping member which are arranged directly adjacent a gripping tong body 3.2 provided as a gripper holder. A coating of a flock material is provided at least in the area of the tips of the gripper jaws 2.2. When the gripper jaws 2.2 grip an object to be gripped, the flocking 5 thus comes into contact with the object to be gripped. This thereby ensures that no sharp-edged metal edges of the gripper jaws 2.2, for example, will be able to come into contact with the object to be gripped.

In the production of the inventive gripper 100, a reactive flocking adhesive is applied within the areas of the gripping members 2.1, 2.2 to be flocked. The flocking adhesive must remain active and reactive or respectively "sticky" for a period of time after application so that the flock fibers, which are typically electrostatically applied, can at least slightly penetrate the adhesive substance and be embedded therein by the crosslinking of the adhesive. This open or reactive phase of the adhesive typically lasts at least a few minutes, e.g. four to five minutes, and the flock fibers must be applied during this open adhesive phase.

Used for example as flocking adhesives are epoxide-based or (meth)acrylate ester-based reactive adhesives or adhesives based on other vinyl compounds or known 2-component adhesives, e.g. based on polyurethane-forming components.

Flocking adhesives based on aqueous polyurethane and polyurethane urea dispersions are preferably used. Working with such aqueous adhesive dispersions prevents the formation of flammable air/solvent vapor mixtures, which could be risky in terms of the subsequent electrostatic flocking 5 which preferably ensues in a high voltage field.

The liquid flocking adhesive is typically applied to the respective areas of the gripping members 2.1, 2.2 or gripping member at ambient temperature and after being applied, exhibits an open and/or reactive adhesive phase lasting a few minutes within which the flock fibers must be applied. Liquid flocking adhesives of this type are typically applied at a layer thickness of approximately 25 µm to approximately 150 µm.

The flock fibers are applied to the reactive or sticky adhesive layer. Flock fibers made of viscose, polyester and/or polyamide as typically used for flocculation purposes are applied. Such flock fibers may for example have a flock fiber length from 0.2 mm to 7.5 mm as well as a flock fiber titer of 1.0 to 5.0 Dtex.

Subsequent the application of the flock fibers, the reactive and/or sticky adhesive layer permutes as intended for the adhesive to crosslink and for an end section of the flock to fix in the crosslinked adhesive layer. "As intended" here refers to the measures for the chemical conversion and crosslinking of the adhesive as resulting from the adhesive compound.

The invention is not limited to the embodiments of the inventive gripper 100 shown as examples in the drawings but rather yields from an integrated consideration of all the features disclosed herein.

What is claimed is:

1. A gripper comprising:
   a gripper holder, via which the gripper is detachably connectable to at least one of a manipulator and robotic arm; and
   at least one gripping member, wherein the at least one gripping member is connected to the gripper holder and realized such that an object to be gripped or workpiece can be gripped by manipulating the at least one gripping member,
   wherein the at least one gripping member has a flocking at least in the area which comes into contact with the object to be gripped or workpiece during the manipulating of the at least one gripping member,
   wherein the gripper is realized as gripping tongs and comprises two pincer-like gripper jaws which are pivotable or linearly displaceable relative to one another along suitable guides which serve as gripping members and are designed to grasp or grip the object or workpiece to be gripped from opposite sides by way of facing gripping surfaces, wherein at least part of the gripping surfaces is provided with the flocking.

2. The gripper according to claim 1, wherein the flocking exhibits fiber filaments, which come into contact with the object to be gripped or workpiece to be gripped during the manipulating of the at least one gripping member at least in some areas connected to the at least one gripping member or at least in some areas incorporated into the material of the at least one gripping member such that the fiber filaments extend substantially perpendicular from the surface of the gripping member.

3. The gripper according to claim 2, wherein the fiber filaments are short cut fibers of polyamide, viscose or polyester.

4. The gripper according to claim 2, wherein the area of fiber filaments extending from the surface of the gripping member has a length of from 0.1 to 1.0 mm.

5. The gripper according to claim 4, wherein the area of fiber filaments extending from the surface of the gripping member has a length of from 0.2 b to 0.8 mm.

6. The gripper according to claim 5, wherein the area of fiber filaments extending from the surface of the gripping member has a length of from 0.3 to 0.7 mm.

7. The gripper according to claim 1, wherein the flock exhibits fiber filaments having a weight (Dtex) of 2.0 to 5.0 g per 10,000 m.

8. The gripper according to claim 7, wherein the flock exhibits fiber filaments having a weight (Dtex) of 2.5 to 4.0 g per 10.000 m.

9. The gripper according to claim 8, wherein the flock exhibits fiber filaments having a weight (Dtex) of 2.8 to 3.8 g per 10,000 m.

10. The gripper according to claim 1, wherein the at least one gripping member is provided with the flocking such that a surface of an object to be gripped or workpiece to be gripped which is gripped by the at least one gripping member is not damaged, dented or scratched by virtue of the flocking.

11. The gripper according to claim 1,
   wherein the gripper is realized as a vacuum gripper comprising the following:
      a flexible suction cup serving as the gripping member which limits a suction area connectable to a vacuum source and at least one seal having a sealing surface facing at least in part toward the object to be gripped or workpiece to be gripped; and
      a suction cup holder serving as a gripper holder which is connected to a rear end region of the suction cup, wherein at least pan of the sealing surface of the at least one seal is provided with the flocking.

12. The gripper according to claim 11, wherein the suction cup has a suction opening adjacent the front end region and a seal surrounding the suction opening, particularly in the form of at least one sealing lip, having a sealing surface facing at least in part toward an object to be gripped or workpiece to be gripped, which is at least in part provided with the flocking.

13. The gripper according to claim 11, wherein at least one hold-down element is provided which has a contact surface facing toward an object to be gripped or workpiece to be gripped which is at least in part provided with the flocking.

14. The gripper according to claim 13, wherein the contact surface of the at least one hold-down element is situated in a plane which intersects the suction area limited by the suction cup, wherein the front end region of the suction cup can move relative to the rear end region of the suction cup and relative to the contact surface of the at least one hold-down element by the suction cup changing length.

15. The gripper according to claim 1, wherein the gripper jaws are coated with an elastic material at least in the area of the gripping surfaces, and wherein the fiber filaments of the flocking at least partially extend from the surface of the elastic material.

16. The gripper according to claim 15, wherein the elastic material is a synthetic rubber.

17. The gripper according to claim 16, wherein the synthetic rubber is a hydrogenated nitrile butadiene rubber (HNBR).

18. The gripper according to claim 1, wherein the gripper realized as gripping tongs comprises a housing serving as gripper holder, in at least part of which a pneumatically operable linear drive is formed.

19. The gripper according to claim 1, wherein the gripper is a pneumatically operated gripper in the form of a vacuum gripper or gripping tongs.

* * * * *